United States Patent
Wu et al.

(10) Patent No.: US 8,164,226 B2
(45) Date of Patent: Apr. 24, 2012

(54) RADIATOR FOR POWER GENERATOR COIL

(75) Inventors: Chih-Hsien Wu, Hsin-Tien (TW);
Yi-Feng Tsai, Fengshan (TW)

(73) Assignee: Digisine Energytech Co., Ltd., Taipei (TW)

( * ) Notice: Subject to any disclaimer, the term of this patent is extended or adjusted under 35 U.S.C. 154(b) by 275 days.

(21) Appl. No.: 12/720,680

(22) Filed: Mar. 10, 2010

(65) Prior Publication Data
US 2011/0221289 A1   Sep. 15, 2011

(51) Int. Cl.
*H02K 9/00* (2006.01)
(52) U.S. Cl. ............................................. 310/64; 310/89
(58) Field of Classification Search .................... 310/64, 310/89, 91
See application file for complete search history.

(56) References Cited

U.S. PATENT DOCUMENTS

| | | | | |
|---|---|---|---|---|
| 5,606,210 A | * | 2/1997 | Lin | 310/153 |
| 6,037,726 A | * | 3/2000 | Tabata et al. | 318/139 |
| 6,129,193 A | * | 10/2000 | Link | 192/84.1 |
| 8,049,347 B2 | * | 11/2011 | Nishida et al. | 290/10 |

* cited by examiner

*Primary Examiner* — Thanh Lam
(74) *Attorney, Agent, or Firm* — Leong C. Lei

(57) ABSTRACT

A radiator for power generator coil, which is composed of a housing, a front cover, a rotating axle, a plurality of fan blades and a coil disk; wherein the coil disk is provided interiorly with a coil set, and provided at the periphery with flanges; the peripheral wall inside of the front cover is provided with grooves, thereby said flanges of the coil disk can be fastened into the front cover and disposed between the housing and the front cover; the rotating axle goes through a front rotating disk provided with a plurality of magnets, the coil disk interiorly provided with coil set, and then a rear rotating disk provided with a plurality of magnets; the rotating axle has a step, the periphery of which is provided with at least one groove, whereas the periphery of the coil disk has many openings; thus by way of the grooves and openings, the heat occurred during operation of the power generator can be guided and dispersed into air current.

4 Claims, 7 Drawing Sheets

RADIATOR FOR POWER GENERATOR COIL

(a) FIELD OF THE INVENTION

The present invention relates to a radiator for power generator, which can ease guiding and dispersing the heat occurred during operation of the power generator into air current, and particularly to one that applicable to wind power generators or the like structure.

(b) BACKGROUND OF THE INVENTION

While electricity is an indispensable energy resource to human life and work, it is the most preferable that the power is generated by way of natural wind power or water power. Take wind power as an example, it is primarily utilizing fan blades that face the wind and thereby rotating to generate power for use.

The coil of a general wind power generator is provided between the housing and the front cover, and is, via a rotating axle, connected with a front rotating disk provided a plurality of magnets, and coil disk interiorly provided with coils. The front end of the rotating axle is extruding out of the center of the front cover and connected with a fan cover, thereby, when the wind blow to rotate the fan blades, the rotating axle is driven to rotate, thereby synchronously driving the front and rear rotating disks, the surfaces of which are provided with a plurality of magnets. In view of the magnetic lines of force of the magnetic poles, the rotation between the magnets and the coils would occur power which, by way of cords, will be relayed to power guiding rail of the activity rack, and to the corresponding electricity brushes of the holder, and then to the exterior of the holder to generate power.

When the power generator is in actual operation, the rotating axle is rotating in a high rotation speed. In addition, under the influence of power generation effect and power generation current, the temperature inside the housing constantly increases and there is almost out of air between the rotation head and the housing, since the temperature of the rotation head is increasing and the air stops circulating. Meanwhile, as the rotating axle is closely connected with the front rotating disk, the coil disk and the rear rotating disk, when the power generator is under a high rotation speed, a long-term rotation status, or a fan brake status, the temperature of the interior coil disk will increase up to above 100° C., and thus damage the structure.

SUMMARY OF THE INVENTION

The primary object of the invention is to provide a radiator for power generator, which can efficiently cool down the coil disk and prolong the use life of the power generator.

To accomplish the above object, the radiator of the power generator according to the present invention is composed of a housing, a front cover, a rotating axle, a plurality of fan blades and a coil disk; wherein the coil disk is provided interiorly with a coil set, and provided at the periphery with flanges; the peripheral wall inside of the front cover is provided with grooves, thereby said flanges of the coil disk can be fastened into the front cover and disposed between the housing and the front cover; the rotating axle goes through a front rotating disk provided with a plurality of magnets, the coil disk interiorly provided with coil set, and then a rear rotating disk provided with a plurality of magnets; characterized at that the rotating axle has a step, the periphery of which is provided with at least one groove which can alternatively be threaded groove(s) or slanting groove(s), and each pair of grooves are corresponding to each other and equally divided the periphery of the step, whereas the periphery of the coil disk has at least one opening; thus by way of the groove(s) and opening(s), the air current could be agitated and circulated, and subsequently the heat occurred during operation of the power generator can be guided and dispersed into the air current.

To completely appreciate these and other objects of the present invention as well as the invention itself, all of which will become apparent to those skilled in the art, the following detailed description of the invention and the claims should be read in conjunction with the accompanying drawings.

DETAILED DESCRIPTION OF THE PREFERRED EMBODIMENTS

Figure 1:
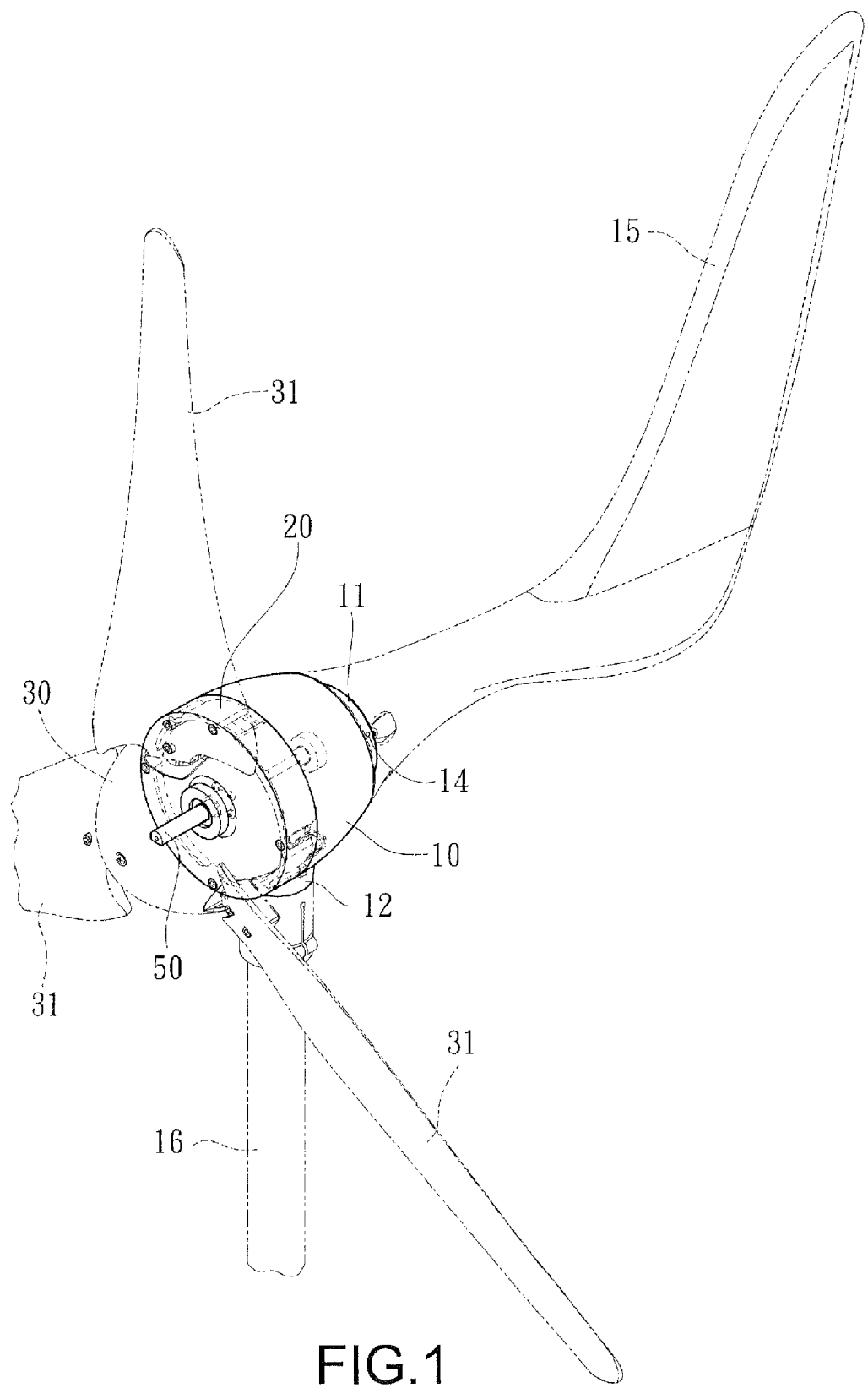
FIG. 1 is a perspective view of the present invention.
Figure 2:
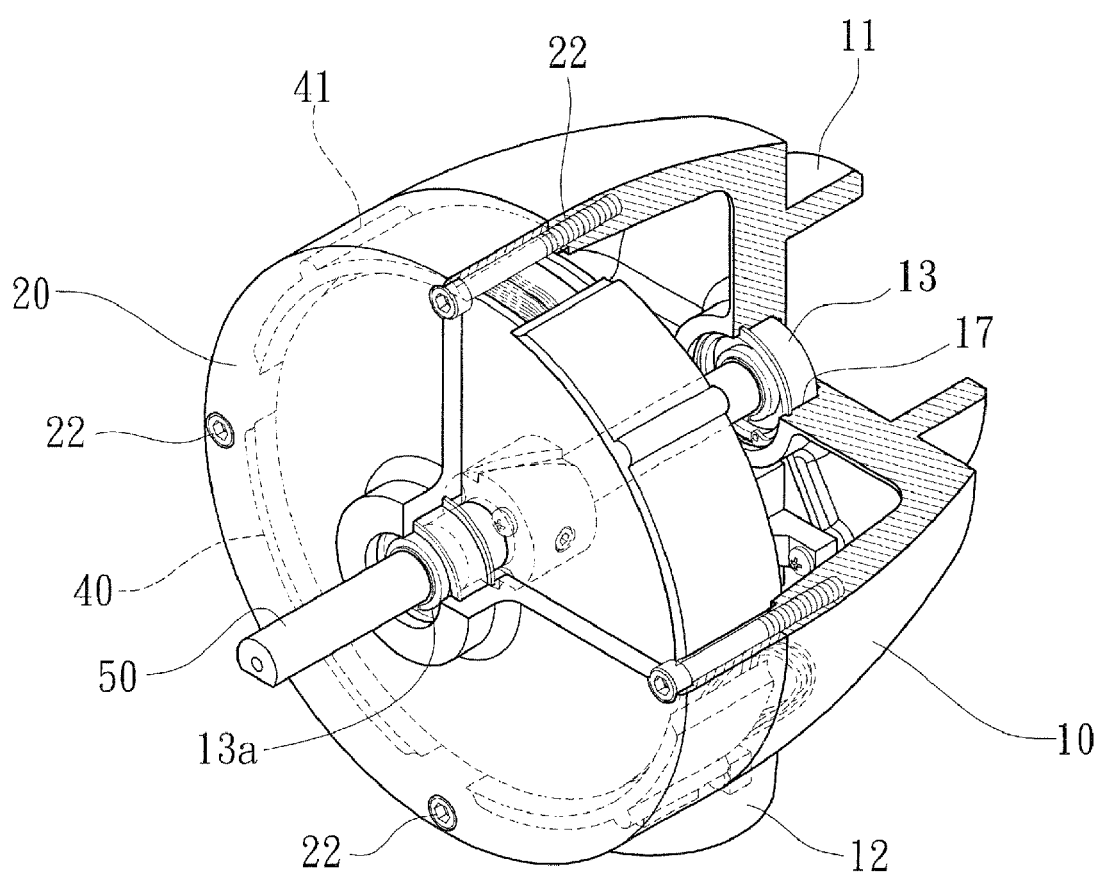
FIG. 2 is a partial perspective view of the present invention.
Figure 3:
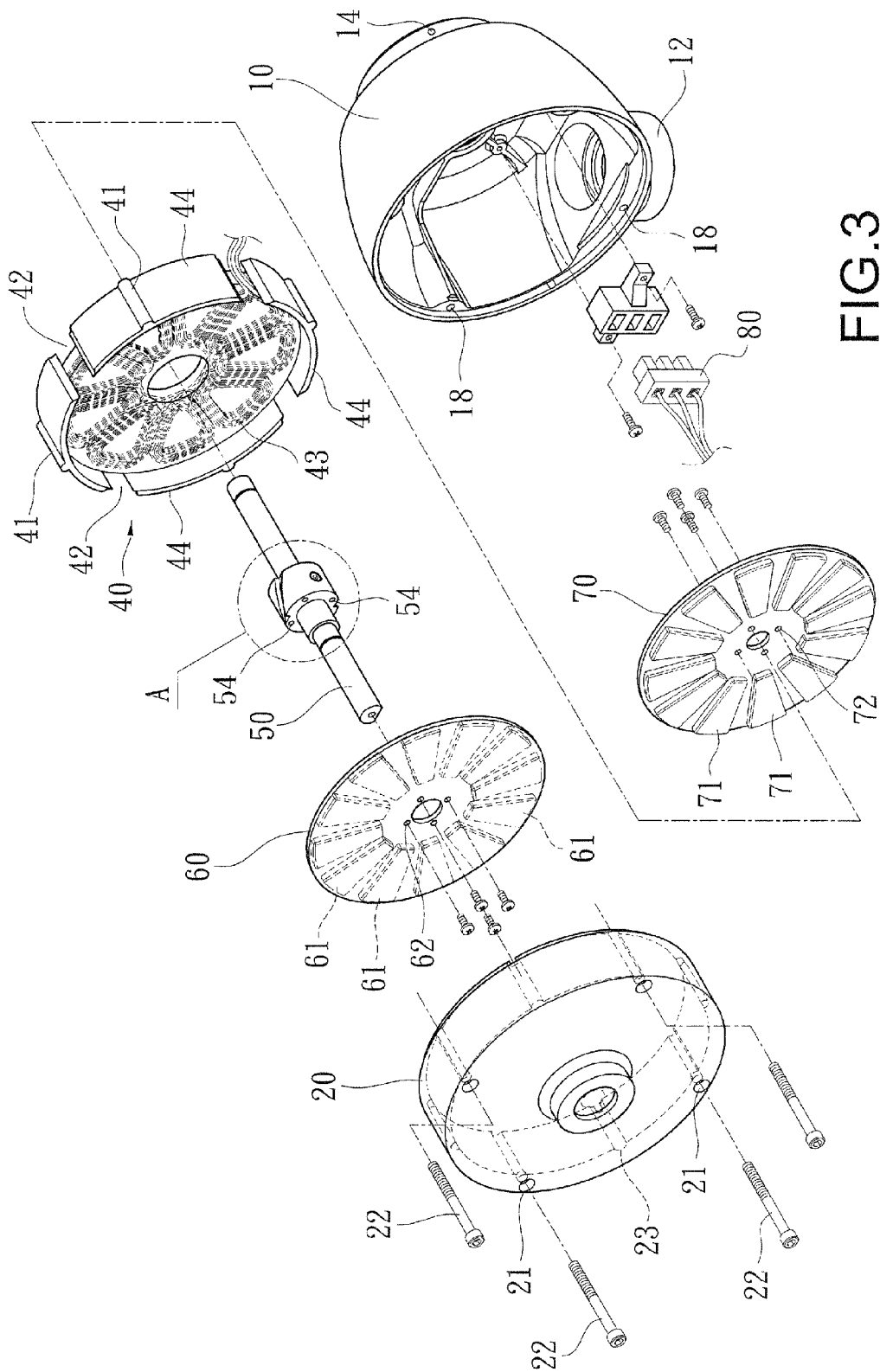
FIG. 3 is an exploded view of the element shown in FIG. 2.
Figure 3A:
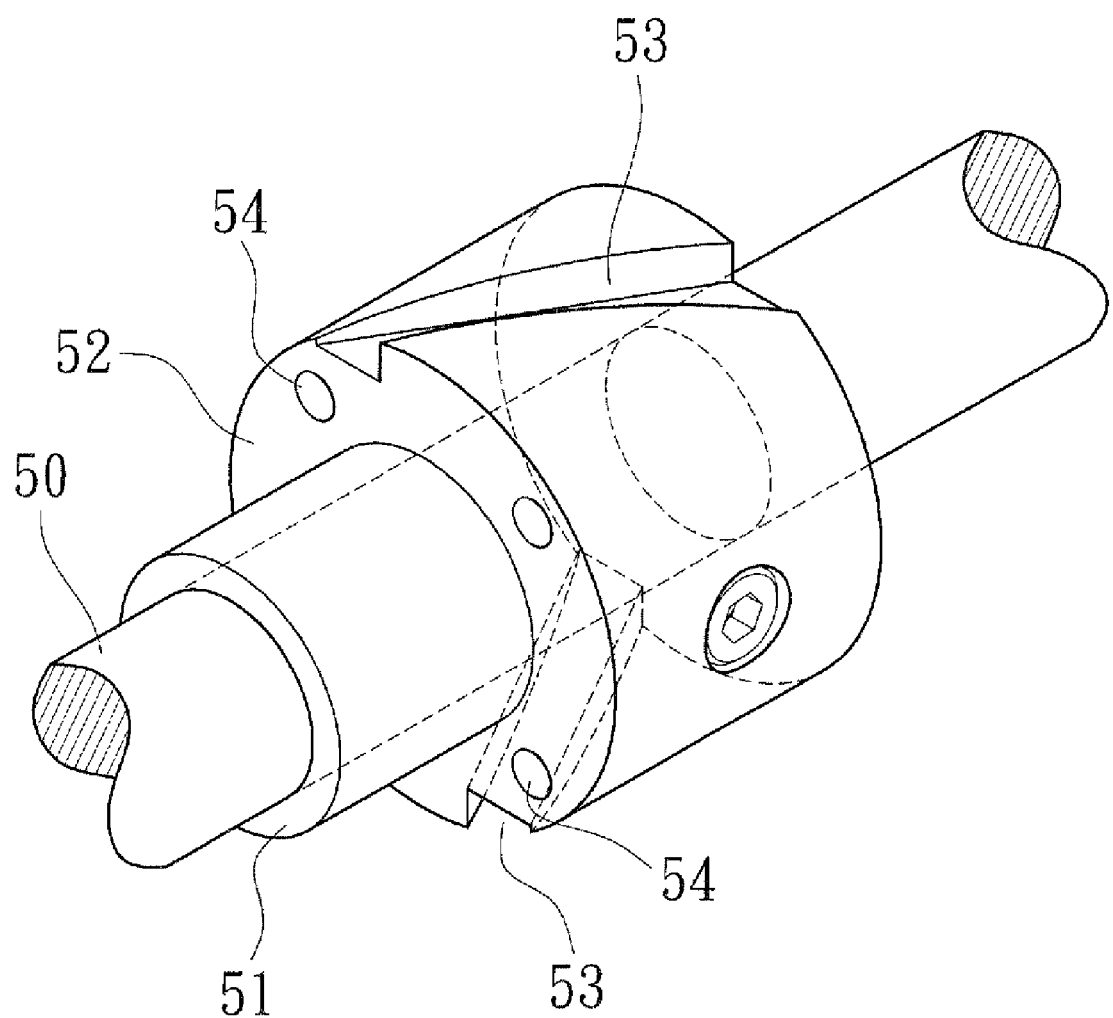
FIG. 3A is a partially enlarged view of the A portion in FIG. 3.

As shown in FIGS. 1~3, the radiator for a wind power generator is composed of a housing 10, a front cover 20, a fan cover 30, a plurality of fan blades 31, a tail 15 and a post 16. The housing 10 and the front cover 20 embrace a coil disk 40 having a coil set 43, a rotating axle 50, a front rotating disk 60 having a plurality of magnets 61, a rear rotating disk 70 having a plurality of magnets 71, and a three-phase switch terminal 80. The housing 10 is provided with coupling holes 14 at the periphery of the rear end, an end base 11 at the bottom for combining with the tail 15, a fillister 17 at the center end for combining with a bearing 13 (see FIG. 2), and a vertical pipe 12 beneath for mounting with the post 16.

The size of the front cover 20 is set in accommodation with the front end of the housing 10. The periphery of the front cover 20 is provided with coupling holes 21 which are corresponding to the positions of coupling holes 18 provided on the housing 10; while the same number of screws 22 are provided. The center of the front cover 20 has a through hole which is interiorly combined with a bearing 13a (see FIG. 2), and the interior wall of the front cover 20 has a plurality of grooves 23.

The periphery of the fan cover 30 is provided with a plurality of fan blades 31 which are engaged and fastened to the rotating axle 50.

The coil disk 40 is interiorly provided with a coil set 43, centrally provided with a through hole, and peripherally provided with several walls 44 extending toward two sides, such that an opening 42 is formed between every two walls 44, and that the surface the every wall 44 is provided with a flange 41.

The rotating axle 50 is in form of a axle having an appropriate length. As shown in FIG. 3, the rotating axle 50 is provided with a first step 41 and a second step 52 which is provided with a plurality of coupling holes 54 at the front end surface and the rear end surface, and is provided with a plurality of grooves 53 at the periphery. The grooves 53 are preferably in form of threaded grooves or slating grooves. The number of the groove in the embodiment as shown is two, which can be three or four such that the grooves 53 are in equal division of the periphery of the second step 52.

The front rotating disk 60 having a size slightly smaller than that of the coil disk 40 is provided with an axle hole at its center; the axle hole has screw holes 62 at its periphery. One surface of the front rotating disk 60 is provided with a plurality of magnets 61 such that when the screws go through the screw holes 62, the front rotating disk 60 can be fastened to the coupling holes 54 at the front end of the rotating axle 50.

The rear rotating disk 70 having a size slightly smaller than that of the coil disk 40 is provided with an axle hole at its center; the axle hole has screw holes 72 at its periphery. One surface of the rear rotating disk 70 is provided with a plurality of magnets 71 such that when the screws go through the screw holes 72, the rear rotating disk 70 can be fastened to the coupling holes 54 at the rear end of the rotating axle 50.

By way of the provision of the magnets (61, 71) on the front rotating disk 60 and the rear rotating disk 70 in a direction corresponding to the coil set 43, the front rotating disk 60 and the rear rotating disk 70 are respectively provided at the two sides of the coil disk 40. The rotating axle 50 goes through the respective central holes of the front rotating disk 60, the coil disk 40 and the rear rotating disk 70 such that the front rotating disk 60 and the rear rotating disk 70 are fastened to the front and rear sides of the second step 52 by way of screws, and that the electric wires of the coil set 43 of the coil disk 40 are combined with the triple switch terminal 80 which, along with the rotating axle 50, is disposed in the housing 10. The rear end of the rotating axle 50 inserts into the bearing 13, and then the front cover 20 mounts on the front end of the rotating axle 50, thereby the rotating axle 50 will go through the central axle hole of the front cover 20 and engage with the interior bearing 13a. The grooves 23 at the interior periphery of the front cover 20 engage with the flanges 41 at the walls 44 of the coil disk 40. After the coil disk 40 is positioned, the front cover 20 is fastened to the housing 10 by way of screws 22 to accomplish the assembly of the invention, as shown in FIG. 4.

Figure 4:
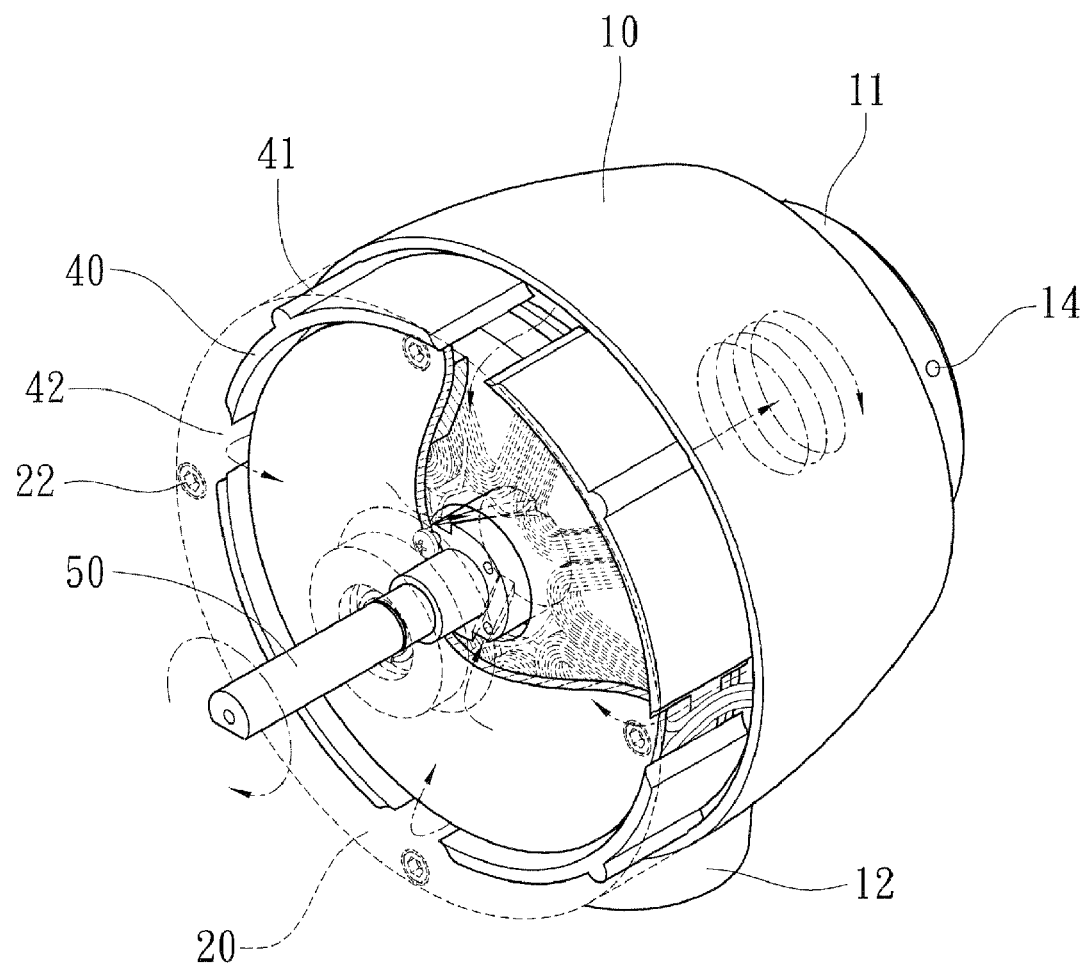
FIG. 4 is a perspective view of an embodiment of the invention, showing the airflow in a use status.

Referring to FIGS. 1 and 4, the front end of the rotating axle 50 is engaged with the fan cover 30 and fastened via screws, thereby the fan blades 31 at the fan cover 30 would rotate against the wind, and drive the rotating axle 50 to rotate as well. The front rotating disk 60 and rear rotating disk 70 combined to the two sides of the second step 52 of the rotating axle 50 synchronically rotate, whereas the magnets (61, 71) on the front rotating disk 60 and rear rotating disk 70 would generate a relationship that cuts the magnetic line of force between the magnet poles, thereby generating electric current which would pass to the guiding rail on the active rack via electric cord, and to the corresponding electric brush on the holding rack, and then to the exterior of the holding rack via a guiding cord to accomplish a power generation effect.

Figure 5:
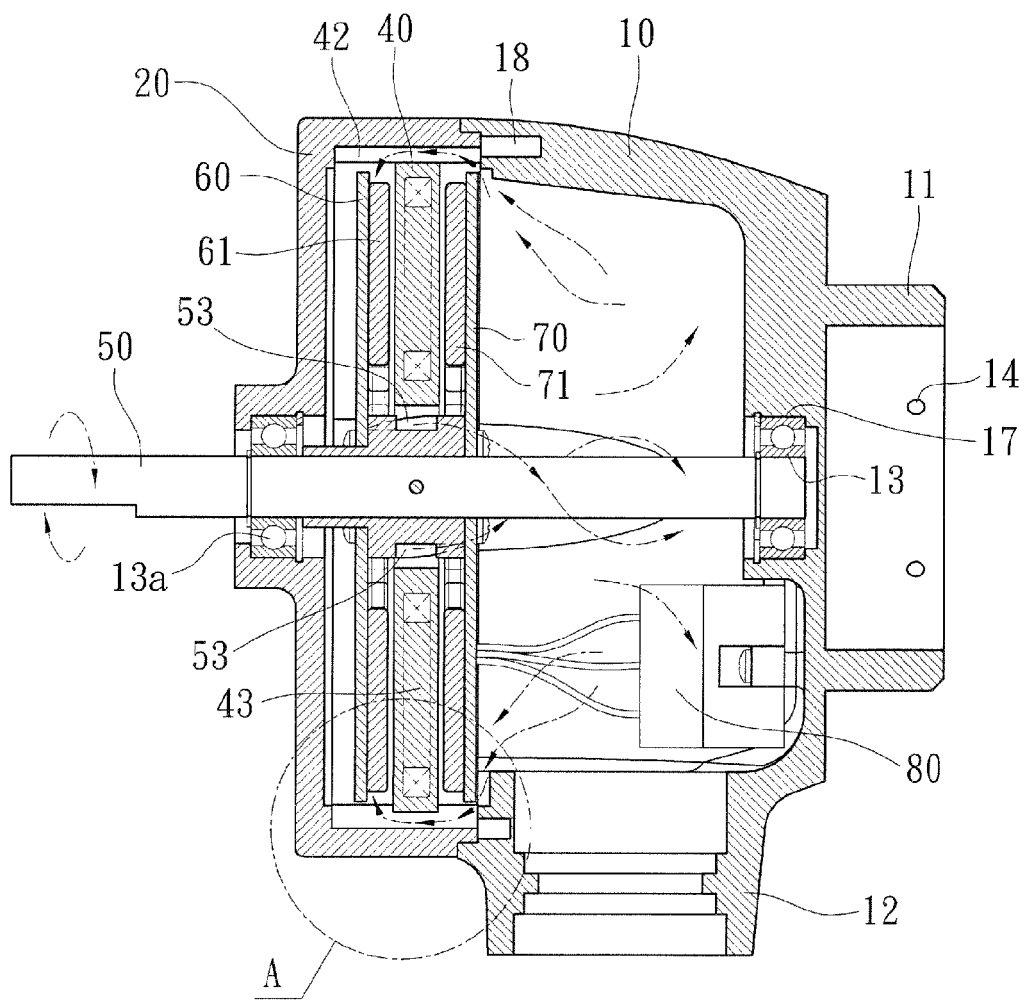
FIG. 5 is a cut-away view of FIG. 4, showing the airflow.
Figure 5A:
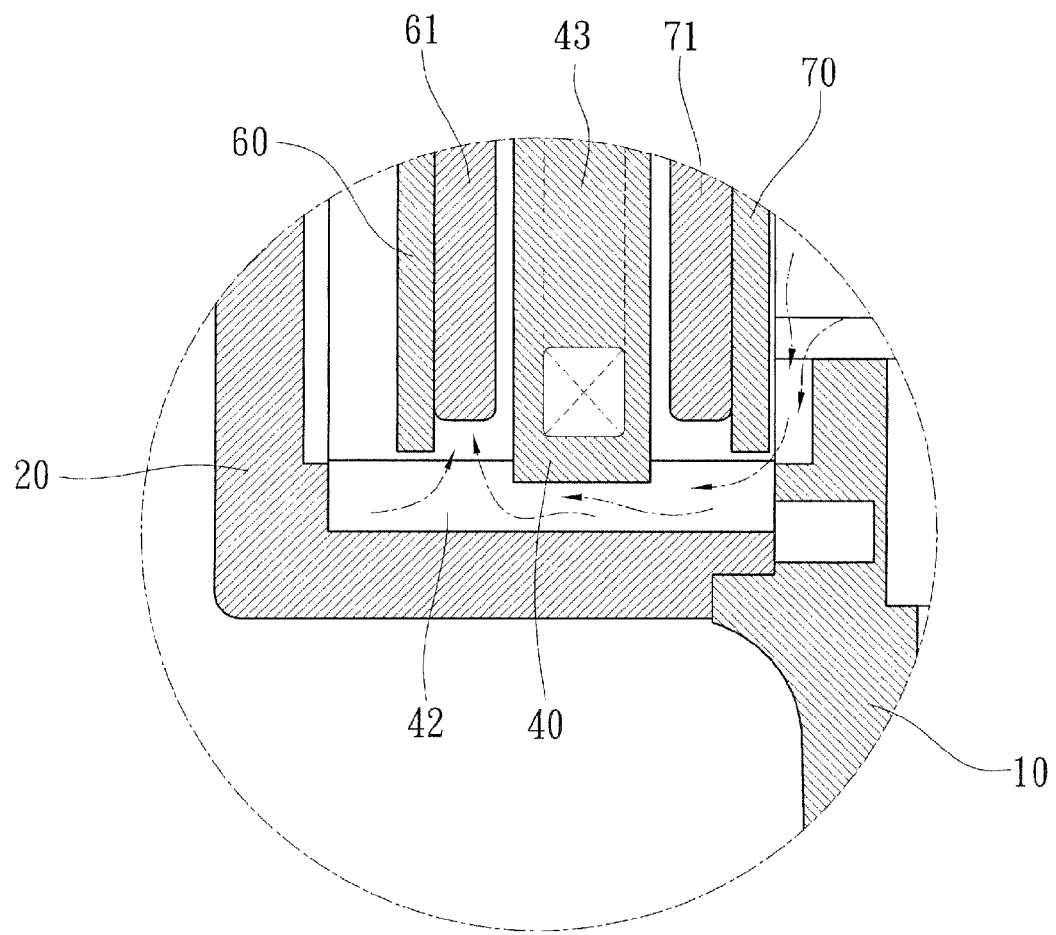
FIG. 5A is a partially enlarged view of FIG. 5.

Referring to FIGS. 5 and 5A, when the rotating axle 50 rotates in a high speed, there would be a crevice between the front and rear rotating disks 60, 70 and the coil disk 40 since the former two are in a size slightly smaller than that of the later. As such, an air current formed inside the housing 10 would generate an air stir and circulation through the opposite grooves 53 provided at the periphery of the second step 52 of the rotating axle 50, and the openings 42 between the walls 44 at the periphery of the coil disk 40. The heat in the housing 10 would be lead to disperse to the exterior, such that the interior of the housing 10 would cool down to a temperature in an acceptable range, in order to extend the use life of the coil disk 40.

Concluded above, the radiator for power generator coil can generate an air circulation effect via the grooves provided at the periphery of the second step of the rotating axle, and the openings at the periphery of the coil disk, thereby the temperature of the interior of the housing and the coil disk may efficiently reduced.

Although specific embodiments have been illustrated and described, it will be obvious to those skilled in the art that various modifications may be made without departing from what is intended to be limited solely by the appended claims.

The invention claimed is:

1. A radiator for power generator coil, composed of a housing, a front cover, a rotating axle, a plurality of fan blades and a coil disk; wherein the coil disk is provided interiorly with a coil set, and provided at the periphery with correspondingly engaged flanges; the peripheral wall inside of the front cover is provided with grooves, thereby said flanges of the coil disk can be fastened into the front cover and disposed between the housing and the front cover; the rotating axle goes through a front rotating disk provided with a plurality of magnets, the coil disk interiorly provided with a coil set, and then a rear rotating disk provided with a plurality of magnets; characterized at that:

the rotating axle has a step(s), the periphery of which is provided with at least one groove, whereas the periphery of the coil disk has many openings.

2. The radiator for power generator coil according to claim 1, wherein the rotating axle is provided with a step(s) having at least one groove, the front and rear ends of the step(s) are connected to the front rotating disk and the rear rotating disk, respectively.

3. The radiator for power generator coil according to claim 1, wherein the step(s) of the rotating axle is provided with two grooves corresponding to each other.

4. The radiator for power generator coil according to claim 1, wherein the periphery of the coil disk is provided with a plurality of walls extending sideward, and an opening is provided between every two walls.

* * * * *